United States Patent
Appleton

[15] 3,650,178
[45] Mar. 21, 1972

[54] MULTI-PURPOSE MULTI-MOTION MACHINE TOOL

[72] Inventor: Joe S. Appleton, 1865 West 120th, Los Angeles, Calif. 90047

[22] Filed: Jan. 8, 1970

[21] Appl. No.: 1,465

[52] U.S. Cl. ............................................ 90/15, 408/236
[51] Int. Cl. ............................................................ B23c 1/06
[58] Field of Search .................. 90/15, 17, 37, DIG. 2; 77/31; 143/47, 46; 408/236, 234

[56] References Cited

UNITED STATES PATENTS

| 90,907 | 6/1869 | Wilmarth | 90/37 |
| 2,742,824 | 4/1956 | Watson et al. | 90/17 X |
| 3,413,893 | 12/1968 | Wilson | 90/17 |

FOREIGN PATENTS OR APPLICATIONS

| 773,319 | 4/1957 | Great Britain | 90/15 |
| 108,483 | 1898 | Germany | 90/37 |
| 298,221 | 1954 | Switzerland | 90/17 |

*Primary Examiner*—Andrew R. Juhasz
*Assistant Examiner*—Z. R. Bilinsky
*Attorney*—Christie, Parker & Hale

[57] ABSTRACT

A gantry type of milling machine capable of traversing in x, y and z directions over a large work table or bed and tilting about the x and y axes is described. The y direction tilt is provided by pivoting a crossbeam extending across the gantry by means of a worm and sector. The crossbeam is supported at its ends by thrust bearings so as to be in tension for minimized weight. A saddle mounted on the crossbeam supports a tool holder pivotable about the x direction which may be employed for conventional milling tools, grinding tools, or the like or for a special tape laying apparatus for laying boron filament tapes or the like on the machine bed, or a workpiece thereon. The tool is indexable and may be pivotable in the z direction.

15 Claims, 6 Drawing Figures

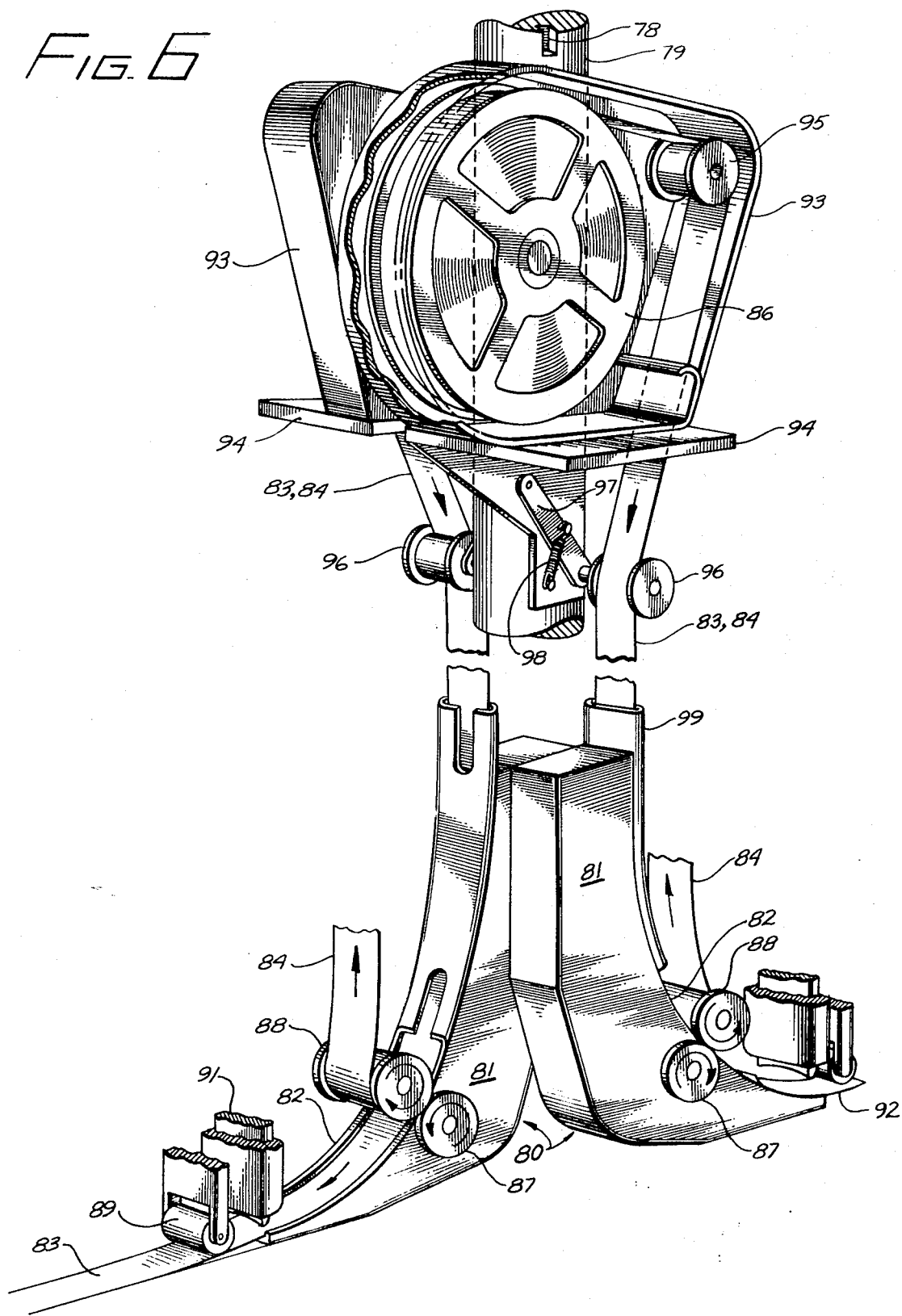

MULTI-PURPOSE MULTI-MOTION MACHINE TOOL

BACKGROUND

In modern machining operations, it has become commonplace to machine complex shapes of very large size, and sophisticated equipment is required in order to perform such operations with a minimum amount of time required to set up the workpiece in the machinery and change the setups in order to perform different machining and related operations. As an example of such a complex operation, the making of aircraft parts incorporating boron filaments laid to complex shapes can be cited. In such an operation a workpiece may be machined to have a fine finish in some complex geometry. Boron filament tapes are then laid on the workpiece and resins bonding the boron filaments to each other and to the workpiece are then cured. After curing, the workpiece may be ground with a grinding attachment to produce a finished part. Many costly, time consuming and expensive setups are required to perform such an operation.

It is therefore desirable to have a machining apparatus that provides for a plurality of machining functions in a plurality of orientations and directions so as to minimize the number of setups that must be made in order to complete the fabrication of the part. In order to do this the machine must be capable of performing many functions and have substantial flexibility to accommodate not only the presently contemplated operations but also those that may be devised in future. With the advent of numerically controlled machines wherein the operations of the machine are controlled by computerized commands recorded on magnetic or paper tape or the like, the limitations of an operator in handling many complex functions at the same time has been overcome. The providing of a multiplicity of functions and motions in a numerically controlled machine is therefore not only feasible but also highly desirable.

BRIEF SUMMARY OF THE INVENTION

Therefore, in practice of this invention according to a preferred embodiment, a multiple motion machine tool is provided having a gantry riding on a pair of machine ways so as to straddle a work bed. A crossbeam mounted on the gantry has a second set of machine ways extending across the work bed and the crossbeam is pivotable about an axis parallel to the ways on the crossbeam. A saddle mounted on the ways on the crossbeam carries a third set of machine ways for mounting a tool holder and means are provided for pivoting the third ways about an axis normal to both the second ways and the third ways. In a preferred embodiment, the tool holder is removable so that apparatus for laying boron filament tapes or the like on a workpiece on the work bed can be employed in the machine tool. Apparatus for laying tapes in a pair of opposite directions is provided.

DRAWINGS

These and other features and advantages of this invention will be appreciated as the same becomes better understood by reference to the following detailed description of a presently preferred embodiment when considered in connection with the accompanying drawings wherein:

FIG. 6 illustrates in perspective a tape laying mechanism for the spindle of FIG. 4.

Throughout the drawings like reference numerals refer to like parts.

DESCRIPTION

Figure 1:
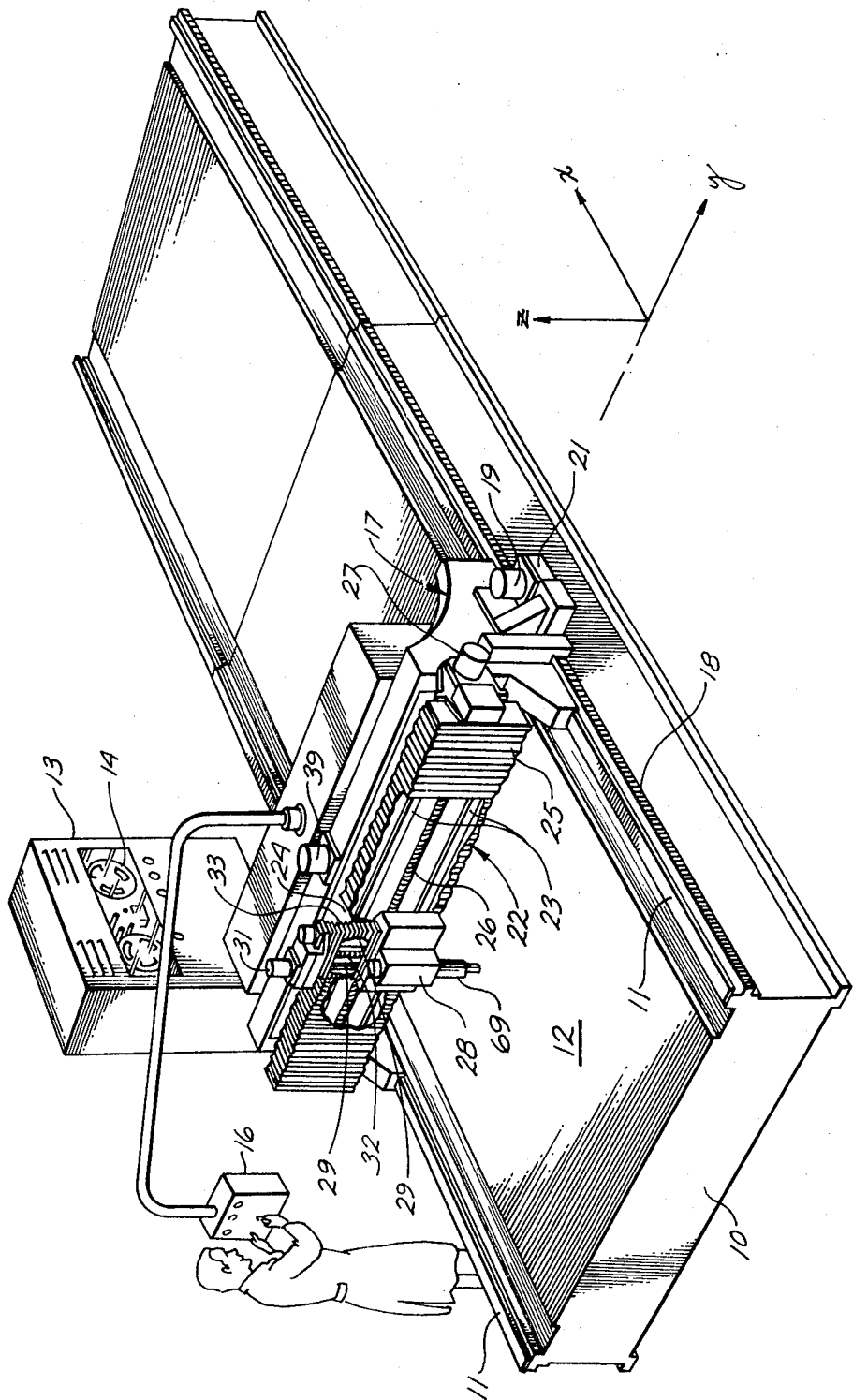
FIG. 1 illustrates in perspective a multiple motion machine tool constructed according to principles of this invention.

FIG. 1 illustrates in perspective a multiple motion machine tool constructed according to principles of this invention. As illustrated in this preferred embodiment there is provided a large horizontal work bed 10, preferably made in a plurality of segments so that additional segments can be added to the work bed as required in order to produce a machine tool of indefinite length. Extending along the length of the work bed 10 are a pair of conventional machine ways 11, one on each side of a top surface 12 upon which a workpiece may be fixed by conventional bolting, T-slots or the like (not shown). On an elongated work bed as illustrated in perspective in FIG. 1 a large workpiece can be provided so that complex machining and other operations can be performed thereon, or if desired two separate stations can be provided on the work bed, one for the conduct of machining operations while the other is being employed for set up of a second machining operation. In this manner the two work stations can be used alternately with a single control and machining unit which may prove highly economical when the machining time and set up time are commensurate.

In order to discuss the motions of the machine it is desirable to define an orthogonal set of coordinate axes wherein the $x$ axis lies horizontally in a direction parallel to the machine ways 11, the $y$ axis is horizontal and transverse to the ways 11, and the $z$ axis is in the vertical direction.

The control of the machine tool is provided by a conventional numerical control unit 13 wherein machining operations are controlled by signals recorded on magnetic tape 14. A manual control panel 16 is preferably also provided for manually overriding or controlling the operation of the machine.

The gantry 17 is mounted on the work bed so as to move along the ways 11 and straddle the workpiece receiving surface 12 of the work bed. The gantry is driven along the work bed on a pair of racks 18, one on each side of the work bed immediately below the ways 11. A pair of motors 19 operate through gear boxes 21 to drive the gantry in the $x$ direction (only one of the motors 19 and gear boxes 21 can be seen in FIG. 1). The two motors 19 on opposite ends of the gantry are coordinated to maintain the axis of the gantry normal to the ways 11.

Mounted on the gantry 17 is a crossbeam 22 described in greater detail hereafter. The crossbeam has a pair of parallel machine ways 23 extending substantially full-length across the width of the work bed for guiding motion in the $y$ direction. A saddle 24 is mounted on the transverse ways 23 and is free to move along the length of the ways in the $y$ direction as controlled by a conventional lead screw 26 which is driven by a conventional servo controlled motor 27 mounted on one end of the crossbeam. A flexible rubber bellows 25 is provided over the ways 23 and lead screw 26 to prevent chips and other debris from accumulating on and damaging these parts. The bellows 25 is connected to the saddle 24 so as to cover the crossbeam throughout any motion of the saddle therealong.

Motion in the $z$ direction, or vertically, is obtained for a spindle holder 28 mounted on the saddle 24 by a third pair of machine ways 29 as described in greater detail hereinafter. Control of the $z$ axis traverse is by a conventional servo controlled motor 31 connected to a conventional lead screw 32. As pointed out in detail hereinafter, the crossbeam 22 and spindle holder 28 are pivotable about the $y$ and $x$ axes respectively, so that the traverse of the spindle holder can be considered to be in the $z$ direction on a precise basis only when the crossbeam and spindle holder are not pivoted from their central or natural position. It is still convenient, however, to consider this as freedom of motion in the $z$ direction even though it may in many circumstances be angled somewhat relative to the vertical. The ways 29 and lead screw 32 are also covered by a flexible rubber bellows 33 to prevent chips, dirt and the like from accumulating on these parts.

As mentioned briefly hereinabove, the entire crossbeam 22 is pivotable about an axis in the y direction so that machining operations can be conducted in complex directions without any problem of leaving tool marks on the surfaces being machined. The effect can be envisioned by noting the arcuate tool marks that occur from an end mill moving down a slope, for example, when axis of the cutter is other than normal to the slope. With an apparatus as provided in practice of this invention, the axis of the milling cutter can be maintained normal to the slope in any direction of cutting so that a very fine finish can be produced without marking by the machine tools, whether milling cutters or of some other variety. Likewise by providing tilt in both the x and y directions holes can be bored at any desired angle and position without repositioning the workpiece.

Figure 2:
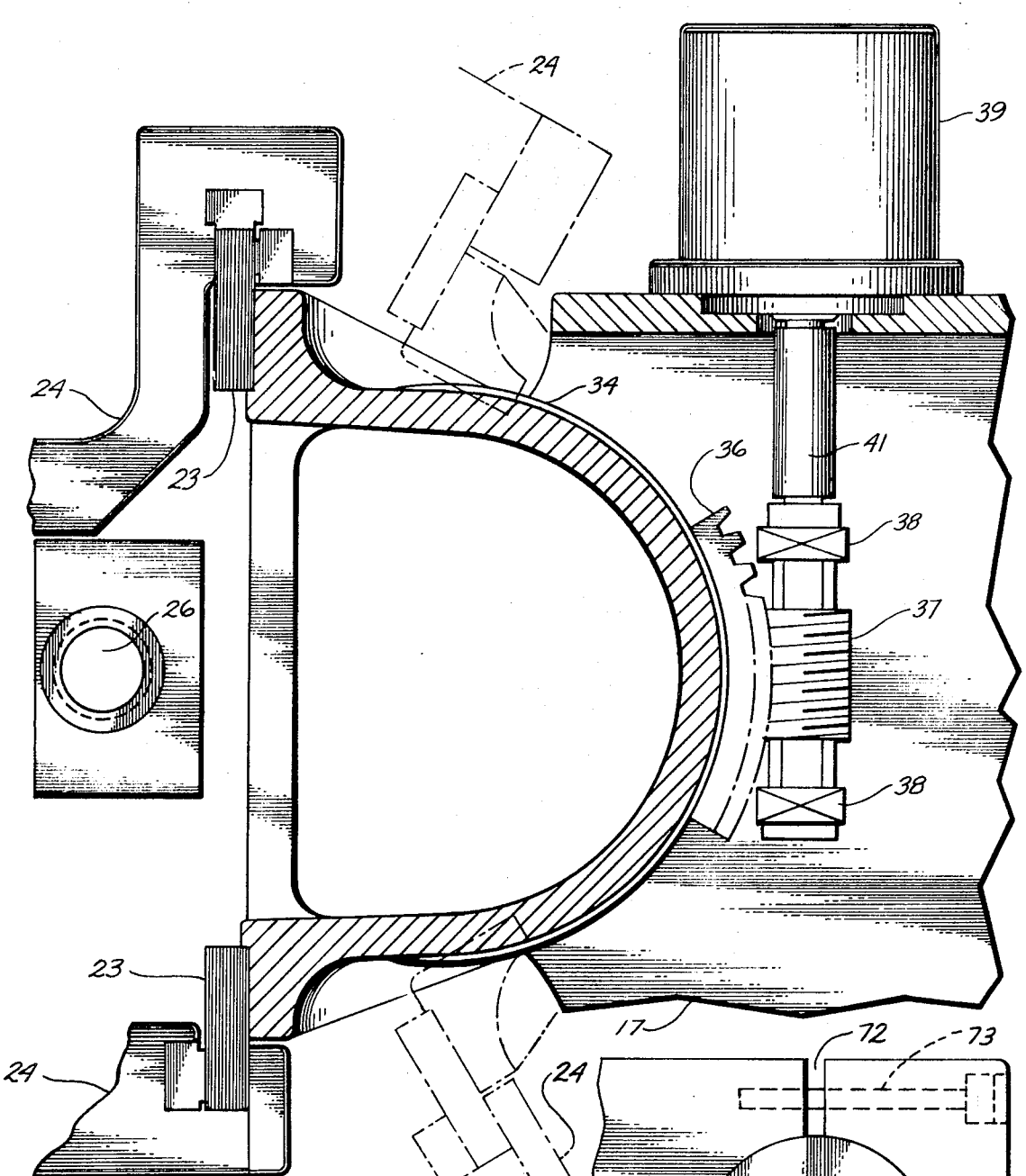
FIG. 2 illustrates a mechanism for pivoting the crossbeam of the machine tool of FIG. 1.

FIG. 2 is a cross-sectional view of the principal structural member of the crossbeam 22 which is an elongated part having a D-shaped cross-section, which supports the pair of y direction ways 23 on which the saddle 24 rides. This D-shaped member 34 is supported at each end on the gantry as hereinafter described. An arcuate gear segment 36 is connected on the circular side of the D adjacent the body of the gantry 17. The gear segment 36 is engaged by a worm gear 37 mounted between conventional bearings 38. A spur gear and sector can be used if desired. A conventional servo motor 39 is coupled to the worm 37 by a shaft 41 so that as the motor 39 drives the worm the entire D-shaped crossbeam member 34 is pivoted about the y axis (normal to the plane of the paper in FIG. 2) thereby pivoting the ways 23 and saddle 24 into positions such as those shown in phantom in FIG. 2. Since the entire crossbeam is thus pivoted about y axis, it will be apparent that the tools in the machine tool are thereby pivoted for machining on slopes or the like.

Figure 3:
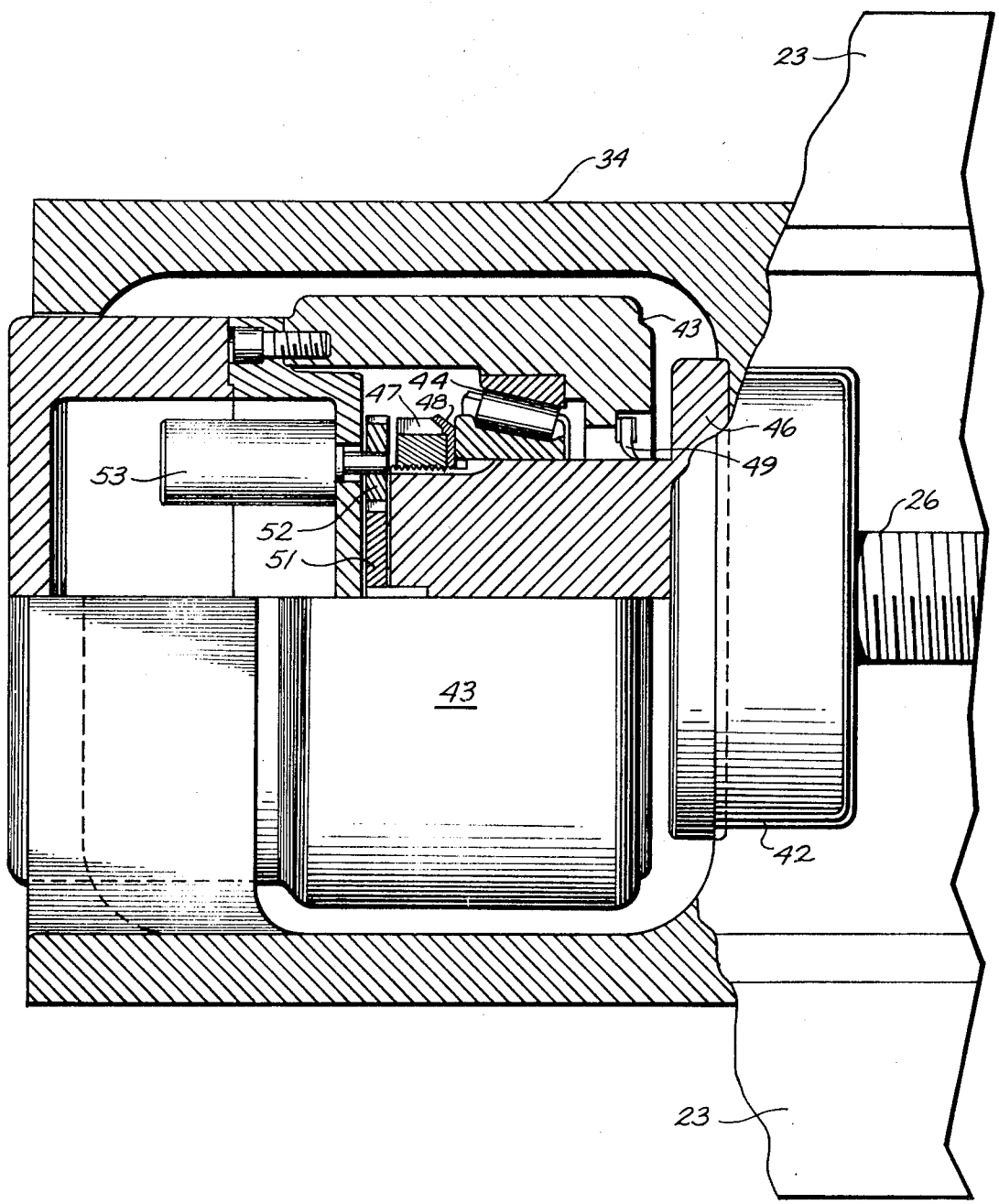
FIG. 3 illustrates in cross-section one end of the crossbeam of FIG. 1.

FIG. 3 illustrates the mounting arrangement for one end of the crossbeam on the gantry. This is a view of the far end of the crossbeam as illustrated in FIG. 1 looking in the x direction from the left end of the machine so that the y axis ways 23 and lead screw 26 are seen. A conventional thrust bearing 42 at one end of the lead screw 26 supports it, the drive for the lead screw being the motor 27 (FIG. 1) at the opposite end of the lead screw. A portion of the end of the D-shaped member 34 is open to provide for connection to an extension 43 of the basic structure of the gantry 17 (not seen in FIG. 3). That is, the extension 43 is fixed against tilting about the y axis and the D-shaped member 34 is free to tilt about the y axis. A heavy duty thrust bearing 44 is mounted between the fixed member 43 and a hub 46 that is securely bolted to the D-shaped member 34. A nut 47 locked in place by a keeper 48 is threaded on the hub 46 so as to preload the thrust bearing 44 and apply a substantial tension load to the D-shaped member 34.

A similar thrust bearing arrangement is employed on the opposite end of the crossbeam for mounting pivotal motion about the y axis, and also for supporting the substantial tension load. By applying such a tensile load along the length of this box member its weight can be minimized while still preventing sagging or bowing of the structure under machining loads. A seal 49 wipes on the hub 46 to seal the chamber containing the thrust bearing 44, and a cap 50 closes the end.

A spur gear 51 is pinned to the hub 46 and engages a pinion 52 which is mounted on the shaft of a sensor 53 which senses the angular position of the D-shaped member and is employed in a conventional servo loop with the drive motor 39 (FIGS. 1 and 2) which controls the y axis tilt of the crossbeam.

Figure 4:
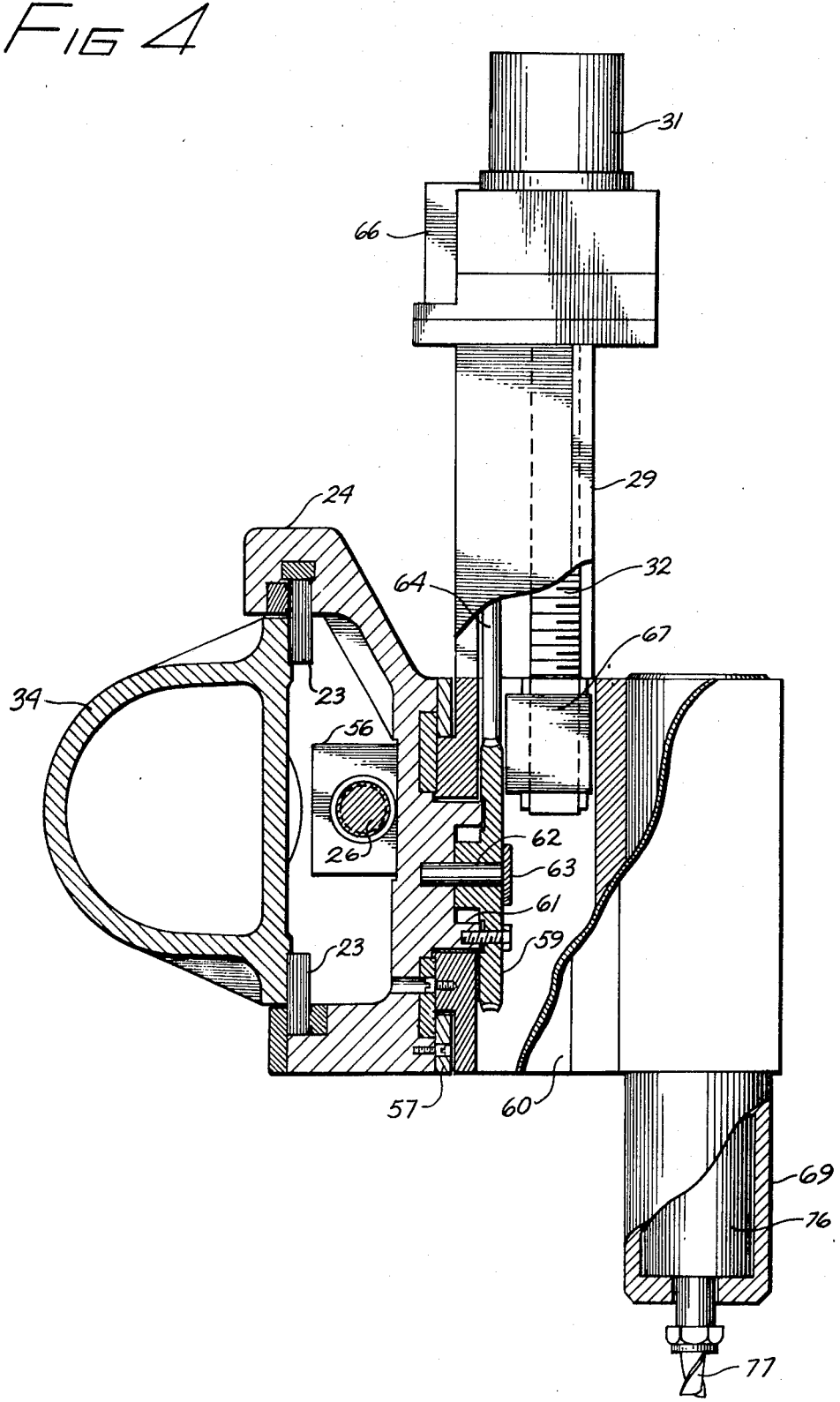
FIG. 4 illustrates the saddle and removable spindle of the machine of FIG. 1.

FIG. 4 illustrates in partial cutaway, means for providing tilt about an axis in the x direction. As seen in this view, the D-shaped member 34 of the crossbeam without any of its supporting structure is at the left-hand side for providing support for the saddle 24 which rides on the ways 23. Also seen in this view is a conventional lead screw nut 56 engaging the y axis lead screw 26. The lead screw nut is securely fastened to the saddle 24 so that as the screw 26 rotates the saddle is driven along the ways 23 in the y direction.

A ring 57 securely bolted to the saddle 24 engages a second ring 58 securely bolted to a z axis support member 60 for mounting the spindle holder 28 of the machine tool. A circular pinion gear 59 is bolted to a circular boss 61 on the saddle 24 with the gear correctly centered by a shaft 62 engaging both the gear and the saddle. A worm 63 mounted on a shaft 64 that is driven by a servo controlled motor 66 engages the periphery of the pinion gear 59. Thus as the motor 66 rotates, the worm draws the z axis support member 60 around the pinion to effect motion and control position about the x axis. Tilt of the z axis support member 60 about x axis occurs at the interface of the rings 57 and 58 which thereby serve to support and position the support member on the saddle.

Also seen in this view of FIG. 4 are the servo motor 31 which drives the z axis lead screw 32 and the conventional lead screw nut 67 which provides z axis motion of the spindle holder 28 along the z axis ways 29 as driven by the screw 32.

Figure 5:
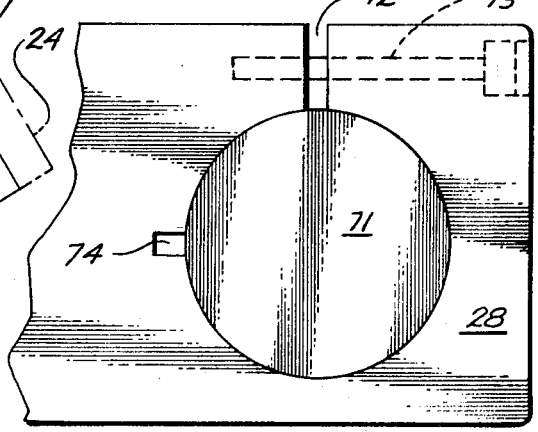
FIG. 5 is a fragmentary vie of a clamping arrangement for the spindle of FIG. 4.

The spindle holder 28 has a vertical cylindrical passage within which a spindle 71 is accommodated. As seen in FIG. 5, a slit 72 extending along the length of the spindle holder 28 is pulled closed by bolts 73 so that the spindle 71 is tightly gripped within the spindle holder. A key way 74 is provided in the spindle holder 28 so that if desired a key can be employed for indexing the spindle 71 or preventing rotation. The use of the key is not found necessary in most situations since the clamping action of the spindle holder on the spindle is adequate for holding the spindle securely in most machining operations. The key way 74 is in a known angular position about the z axis so that a spindle can be indexed to a selected position and angular adjustments provided in the spindle to provide rotary or pivotal motion about the z axis. When such an attachment is employed in the spindle holder it will be apparent that 6° or axes of freedom are provided in the machine tool with the translation and rotation about each of the x, y and z axes.

The spindle 69 illustrated in FIG. 4 is a hollow cylinder which in a typical embodiment may be 4½ inches in diameter. Within the hollow cylinder is a conventional pneumatic motor 76, such as are presently available in such sizes up to about 6 horsepower. In the illustrated embodiment an end mill 77 is connected to the shaft of the motor 76 for milling a workpiece for example. A grinding attachment or other tools can be employed for modifying a workpiece on the bed.

FIG. 6 illustrates another mechanism for modifying a workpiece on the work bed 12 which can be substituted for the spindle 69 and end mill 77 in FIG. 4. As mentioned hereinabove, there has been increasing interest in recent years in the use of boron filaments for high strength, low weight parts such as may be employed in aircraft. In making such parts it is often necessary to machine a substrate to a complex compound curvature geometry prior to applying boron filaments to the surface, and then the compound curved part must be ground after the boron filaments are bonded in place in order to finally smooth the surfaces. It is highly desirable to provide both the initial machining and the boron filament lay-up operations on the same machine and with the same tooling setup so that the setup time is minimized and inaccuracies do not accumulate on the parts being made. Preferably the boron filaments are bonded in place on the same setup so that final grinding can also be in the same machine.

The boron filaments suitable for such lay-up are presently commercially available in the form of a large number of the small diameter parallel boron filaments laid upon a paper tape or the like for application to a surface. The boron filaments are in a sheet of parallel filaments and may be coated with a thermosetting resin for bonding to each other and to the surfaces to which they are applied. The technique for application is to lay boron filaments on a surface, apply pressure thereto, usually hydrostatically as with vacuum bags or the like, and heat the part so formed to a sufficient temperature to cure the resin. Many layers of filaments may be so applied and the filaments in separate layers may be crisscrossed to carry bidirectional stresses.

FIG. 6 illustrates semi-schematically a mechanism for efficiently laying boron filament tape or the like on a workpiece with a multiple motion machine tool as provided in practice of this invention. This tool is mounted on a cylindrical post 79 on the bottom end of which are a pair of substantially identical tape dispensing units facing in opposite directions so that economy of machine motion can be provided. Thus for example, if tape is being dispensed simply along the x direction in the machine tool of FIG. 1, one of the tape dispensing units 80 is employed as the gantry traverses to one end of the work bed and the other tape dispensing unit is employed when the gantry reverses and comes back towards the original end. In this situation at the end of each stroke along the bed, the saddle is moved in the y direction to index the tape dispenser so that each strip of tape dispensed onto a workpiece is immediately adjacent the preceding strip of tape. By providing for a reversible dispensing of tape any a requirement for bringing the gantry or other parts of the apparatus back to the original position before proceeding is avoided and the rate of tape dispensing can be nearly doubled.

The tape dispensing unit is mounted upon a cylindrical post 79 which may be provided with a key way 78 so that the post and hence tape dispensers can be accurately aligned with the y axis. Additional key ways can be employed in the post 79 or spindle holder 28 for indexing the post to the x axis, or at 45° to the x and y axes or at any other desired position for crisscrossed lay-ups of filaments. It is preferred to employ one indexing such as the key way 78 and make the tool mounted in the spindle holder controllably pivotable in the z direction so that full six axis control is provided. This is readily accomplished with conventional mechanizations and is controlled with the same numerical control unit as the previously described 5° of control since in tape unit commonly employed has eight channels on the tape and only one need be used for each degree of freedom in translation and rotation.

Each of the tape dispenser units 80 at the bottom of the tool post 79 comprises a closed housing 81 having one curved face 82 for providing a gradual curved transition from vertical to horizontal direction. A boron filament tape 83, for example, passes along the curved face 82 and emerges from the horizontal end thereof to be laid directly on a workpiece surface.

In a preferred embodiment the boron filament tape is laid on the surface of a conventional perforated plastic strip 84 such as employed as a base for conventional 8, 16 or 35 millimeter motion picture film. Often two such plastic strips 84 are employed, one on each face of the strip of boron filaments 83 to be laid on the surface or one or both can be perforated paper tape. In the embodiment of FIG. 6 only one of the plastic strips 84 is illustrated as hereinafter mentioned, the other plastic strip if used accumulating within the housing 81 after stripping from the sheet of boron filaments.

In order to deploy the boron filaments from a storage reel 86 onto a workpiece, a drive sprocket 87 is provided on the housing 81 for engaging the perforations in the plastic strip holding the boron filaments. A small motor (not shown) within the housing 81 may be employed for driving the sprocket 87. Opposing the sprocket 87 is an idler spool 88 about which one of the plastic strips 84 is reeved to be led to a takeup spool (not shown). The other plastic or paper strip (if used, hidden in FIG. 6) passes around the sprocket 87 and accumulates within the housing 81, or if desired it can be brought through the back of the housing to a takeup reel. The two strips 84 are thus stripped from the boron filaments which extend as a ribbon beyond the lower end of the housing 81 to be laid on the workpiece surface. A retractable, spring biased roller 89 beyond the end of the housing 81 presses the strip of boron filaments against the surface to which it is to be attached and a conventional shear 91 severs the strip of boron filaments on command at the end of a selected traversal on a workpiece. After shearing off the end, a short tab 92 is further dispensed by the unit so as to be between the retractable, spring biased roller 89 and a workpiece surface for application to the surface on the next stroke of the dispensing unit.

As mentioned hereinabove, the boron filament tape between the plastic strips is stored on a reel 86 which is contained within a housing 93 mounted on an L-shaped bracket 94 on the tool post 79. Upon leaving the reel 86 the tape passes over an idler pulley 95 in the housing and then out of the housing and over an idler pulley 96 mounted on a pivoted arm 97 biased by a spring 98 to maintain tension in the tape. The tape then passes through a guide 99 along the curved face 82 of the housing 81 to be dispensed by the apparatus.

Although only one embodiment of multi-purpose, multi-motion tool has been described and illustrated herein, many modifications and variations will be apparent to one skilled in he art. Thus, for example, the scale of the apparatus can be greatly enlarged for accommodating very large workpieces on the work bed and other manual and automatic control arrangements can be employed. Some other detailed mechanical arrangements for achieving motion of the apparatus in translation in the x, y and z directions and pivoting in the x and y directions can readily be provided by one skilled in the art. A removable spindle has been provided for ready adjustment and interchanging of tools for modifying a workpiece by machining, grinding, or laying boron filaments on the surface, for example. Modifications of the spindle and means for clamping the spindle in position can be provided and other tools for use with the multi-purpose machine can be provided for performing operations without any necessity of elaborate changes of set up. Although is particular a tape dispensing unit has been described and illustrated, it will be apparent that modifications and variations can be made in this apparatus to simply and reliably deploy filament tapes and the like so that the same apparatus can be employed for both machining and tape laying operations.

Another significant modification is to provide the ability to employ heated platens on the work bed so that all or at least a portion of the curing of the resin on the boron filaments can be provided on the work bed of the apparatus without disturbing the set up, thus permitting final grinding operations to be conducted without introducing errors due to positioning of the workpiece on the work bed. Many other variations and modifications will be apparent to one skilled in the art.

What is claimed is:
1. A multiple motion machine tool comprising:
    a work bed;
    a first pair of machine ways, one on each side of the work bed;
    a rigid gantry straddling the work bed and riding on the ways;
    a crossbeam pivotally mounted on the gantry and extending substantially normally across the work bed;
    second machine ways on the crossbeam and extending normal to the first pair of ways and substantially across the work bed; a saddle mounted for movement along the second ways; and
    means for pivoting the crossbeam, second ways, and saddle about an axis parallel to the second ways.
2. A multiple motion machine tool as defined in claim 1 wherein the saddle further comprises:
    third machine ways;
    a tool holder mounted on the third ways; and
    means for pivoting the third ways about an axis normal to both the second ways and the third ways.
3. A multiple motion machine tool as defined in claim 2 wherein the tool holder comprises:
    a support member mounted on the third ways;
    operating means for operating on a workpiece on the work bed;
    motor means for driving the operating means; and
    means for detachably connecting the operating means and the motor means as a unit to the support member.
4. A multiple motion machine tool as defined in claim 3 wherein the operating means comprises a rotary cutting tool.
5. A multiple motion machine tool as defined in claim 1 further comprising means for applying a tension load between the crossbeam and the gantry for maintaining the crossbeam in tension.

6. A multiple motion machine tool comprising:
a substantially horizontal work bed;
a first pair of machine ways, one on each side of the work bed;
a rigid gantry straddling the work bed and riding on the ways;
means for moving the gantry along the length of the work bed;
a crossbeam pivotally mounted on the gantry and extending normally across the work bed;
a second pair of machine ways on the crossbeam and extending normal to the first pair of ways and substantially across the work bed;
a saddle mounted on the second pair of ways;
means for moving the saddle along the length of the second pair of ways; and
means for pivoting the crossbeam, second pair of ways, and saddle about an axis parallel to the second pair of ways.

7. A multiple motion machine tool as defined in claim 6 further comprising a third pair of machine ways mounted on the saddle; and
means for pivoting the third pair of ways about an axis normal to both the second pair of ways and the third pair of ways.

8. A multiple motion machine tool as defined in claim 7 further comprising:
a spindle support mounted on the third pair of ways;
means for moving the spindle support along the third pair of ways; and
means for detachably connecting a spindle to the spindle support.

9. A multiple motion machine tool as defined in claim 8 further comprising:
a spindle detachably connected to the spindle support, said spindle comprising means for operating on a workpiece on the work bed, and motor means for driving the operating means.

10. A multiple motion machine tool as defined in claim 9 wherein:
the spindle comprises a cylindrical body for mounting said motor means and the means for operating; and wherein
the means for detachably connecting comprises means for releasably clamping the cylindrical member in a fixed position parallel to the third pair of machine ways.

11. A multiple motion machine tool as defined in claim 10 further comprising:
means for indexing the spindle for controlling spindle angular position about an axis in a direction parallel to the third set of ways, whereby the machine tool is free to controllably move in three directions of translation and about three axes of rotation.

12. A multiple motion machine tool as defined in claim 6 wherein the means for pivoting comprises:
a gear sector connected to the crossbeam;
a drive gear mounted on the gantry engaging the gear sector; and
means for rotating the drive gear.

13. A multiple motion machine tool as defined in claim 12 further comprising means for sensing pivotal position of the crossbeam for controlling the means for rotating the drive gear.

14. A multiple motion machine tool as defined in claim 12 further comprising means for maintaining the crossbeam in tension.

15. A multiple motion machine tool as defined in claim 14 wherein the means for maintaining the crossbeam in tension comprises:
a pair of opposed thrust bearings interconnecting the gantry and the ends of the crossbeam; and
means for applying a tension load between the thrust bearings and the crossbeam.

* * * * *